W. F. Ketchum,
Harvester Cutter,
Reissued. Mar. 26. 1861.
No. 57
1162
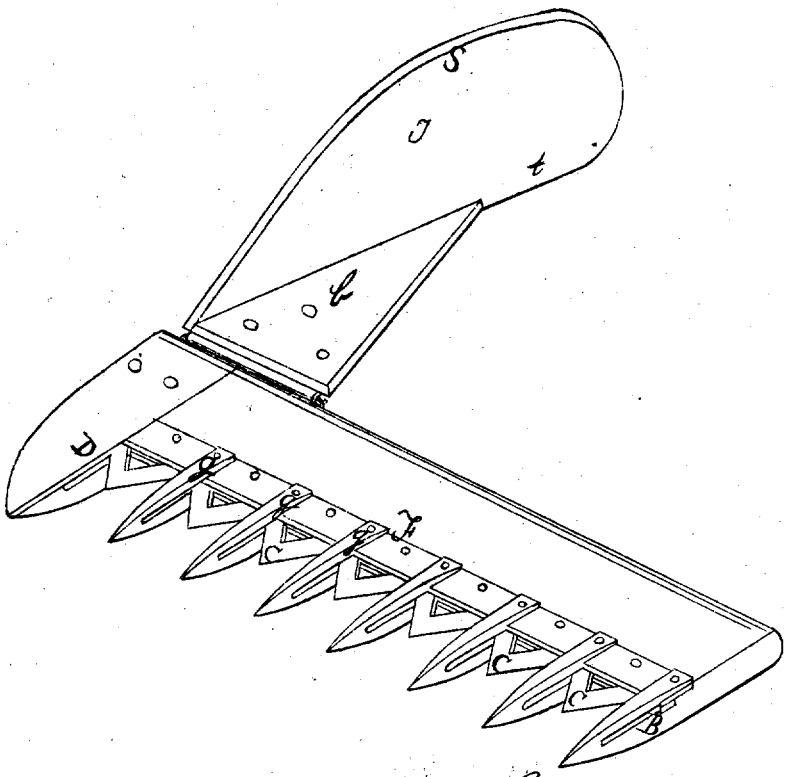
Witnesses H. C. Baum
Jno. S. Baum
W. F. Ketchum
End View Enlarged
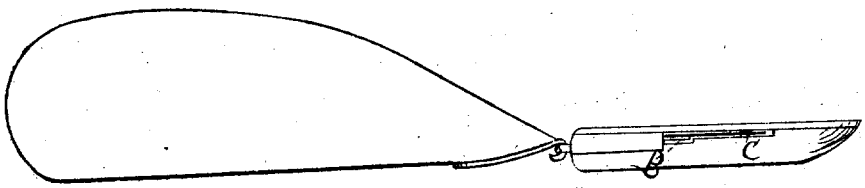

UNITED STATES PATENT OFFICE.

WILLIAM F. KETCHUM, OF BUFFALO, NEW YORK.

IMPROVEMENT IN TRACK-CLEARERS TO HARVESTERS.

Specification forming part of Letters Patent No. 9,737, dated May 17, 1853; Reissue No. 1,162, dated March 26, 1861.

*To all whom it may concern:*

Be it known that I, WILLIAM F. KETCHUM, of Buffalo, State of New York, have invented new and useful Improvements in Mowing-Machines, whose object is so to separate the cut from the uncut grass as to leave a clear track next to the standing grass for the passage of the heel of the finger-bar in cutting the next swath; and the following is a full and clear description of the same, reference being made to the drawings herewith filed and making a part hereof, in which—

Figure 1 is a perspective view of my improvements; Fig. 2, a view taken endwise of the finger-bar at the end next the standing grass or the outer end, where the track-clearer is placed.

In the figures, F is the finger-bar; D, the divider; T, the track-clearer; *b*, an angular brace; *g*, the guard-fingers; B, the cutter-bar, and *c* the cutter-teeth.

I have essayed various forms, all of which involve the same general character and all of which are useful. It is unnecessary here to describe particularly all these forms, but I will describe that which is set forth in my original patent, which works well and involves them all. The finger-bar, the cutter-bar, the cutters, the guard-teeth, and divider require no description, except in the particulars hereinafter set forth. The track-clearer is attached in rear of the divider, and is a piece of wood or metal extending backward several feet in a direction inclined horizontally toward the finger-bar, and its lower part extending along near the ground and low enough to avoid passing over the cut grass. As I make it the upper part rises as it extends backward until it attains some ten or fifteen inches above the ground. It must have a suitable height. The angular board B, to which it is attached, acts as a brace, and may be dispensed with, and other convenient and equivalent means used to hold the track-clearer at the proper angle. The front end of the track-clearer is represented as hinged at the rear of the divider, so that it can rise and fall with the inequalities of the ground, and this mode of connecting I generally prefer; but in smooth, level meadows the joint is unnecessary, and in most meadows the track-clearer will serve a very useful purpose without the hinge.

In an attempt made before my invention to cut grass by machines and clear a track for the heel of the cutters, the outer end of the cutters and cutter-bar was sustained and guided by a hinged-bar extending backward above the finger-bar to a point in the rear thereof, where it was hinged. To the front of this bar the cutter-bar was attached, and thus at every motion of the cutter-bar and cutters this hinged bar vibrated the same distance that the cutters moved, and in front of the scraping-board or track clearer, interfering with its location and impairing its action.

My cutter-bar is guided and supported by slots in the guard-fingers and in the divider through which it passes, and reciprocates in a right line. These slots are extended forward and narrowed for the passage of the cutter-teeth, leaving shoulders, between which and the backs of the slots the cutter-bar fits and is supported and guided. These slots, with the cutter-bar and cutters therein, will be seen in the drawings at B. Thus the hinged bar is dispensed with, and its inconveniences and the impediments to the action of a track-clearer are avoided.

It will be readily perceived that the upper and lower edges of the separator T, as represented, perform distinct duties. As the machine moves onward the divider passes between the grass to be cut and that which is to be left standing, dividing them, and as the cutters reach that which is to be cut, they cut it, and it falls backward across the cutter-bar, and the machine still advancing, the lower part of the track clearer or separator, coming in an inclined position against it, sweeps it inward toward the wheel and away from the standing grass, leaving the desired track, while the upper line thereof, entering the opening made by the divider and rising and inclining from the standing grass, will aid in separating from the standing grass that portion of the cut grass which is entangled therewith and let it fall with the rest of the cut grass.

The divider to be used with my improvements I prefer should be made short, as represented in the drawings, not extending materially in rear of the finger-bar, though the track-clearer will, especially on smooth ground, do good service even though the divider extend a considerable distance behind the finger-bar; but the farther the divider extends behind the finger-bar the more cumbrous the apparatus will be, the more liable to break, and the more liable to fail in its duty, being lifted by the inequalities of the ground above the mown grass, or lifted by the rising of the cutter, so that its forward part will override the cut grass. For these reasons, among others, I regard the use of a short divider, immediately in front of the track-clearer or separator a great improvement.

Having fully described my improvements, what I claim as my invention, and desire to secure by Letters Patent, is—

1. A track clearer or scraper placed near the outer end of the finger-bar and behind the divider at an acute angle with the finger-bar, arranged in relation to the same, so as to sweep the grass inward as it falls over the finger-bar, and with cutters supported and guided near their outer end wholly by stationary supports or guides, so that the mechanism for the operation of the cutting apparatus will not clog or obstruct the action of said track clearer or scraper, substantially as described.

2. Placing the lower surfaces of the rear of the divider and front end of the track-clearer close together and substantially on a level with the under surface of the cutter-bar, substantially as described.

3. Connecting the track-clearer at its front end by a vertically-yielding joint placed near its lower surface, substantially as set forth.

4. The combination of the divider with a track-clearer, connected at the rear thereof, and standing at an acute angle with the cutter-bar, while the lower edge of the track-clearer is on or near the ground and its upper edge rises gradually backward from the upper surface of the divider, substantially as set forth.

5. The short divider, in combination with a track-clearer attached close to its rear and at an acute angle with the finger-bar, as set forth.

6. Placing the front end of the inclined track-clearer close to the rear of the divider, at or near its outer side, and beyond its extreme cutting-point, so that the grass shall fall over the cutters and finger-bar inside of the track-clearer in condition to be swept inward, substantially as described.

W. F. KETCHUM.

Witnesses:
W. S. SHAW,
GEO. H. AUGHSON.